United States Patent
Chowdhury et al.

(10) Patent No.: US 7,351,191 B2
(45) Date of Patent: Apr. 1, 2008

(54) METHOD FOR STABILIZING CONTAMINATED WASTE

(75) Inventors: Ajit K. Chowdhury, Madison, WI (US); Jeff C. Macri, Clayton, IN (US); Kevin L. Baker, Madison, WI (US); Gregory J. Graf, Madison, WI (US)

(73) Assignee: RMT, Inc, Madison, WI (US)

( * ) Notice: Subject to any disclaimer, the term of this patent is extended or adjusted under 35 U.S.C. 154(b) by 0 days.

(21) Appl. No.: 11/218,678

(22) Filed: Sep. 2, 2005

(65) Prior Publication Data

US 2006/0052653 A1    Mar. 9, 2006

Related U.S. Application Data

(60) Provisional application No. 60/606,754, filed on Sep. 2, 2004.

(51) Int. Cl.
*B09C 1/00* (2006.01)

(52) U.S. Cl. ........................... 588/256; 588/252

(58) Field of Classification Search ................. 588/252, 588/256
See application file for complete search history.

(56) References Cited

U.S. PATENT DOCUMENTS

| | | | | |
|---|---|---|---|---|
| 4,318,996 A | * | 3/1982 | Magder | 501/84 |
| 4,354,876 A | * | 10/1982 | Webster | 106/611 |
| 4,615,809 A | * | 10/1986 | King | 588/315 |
| 5,304,709 A | * | 4/1994 | Babcock et al. | 588/257 |

* cited by examiner

*Primary Examiner*—John Kreck
(74) *Attorney, Agent, or Firm*—Quarles & Brady LLP

(57) ABSTRACT

A method for solidifying an oil-contaminated aqueous waste in situ or ex situ includes the step of combining the oil-contaminated waste with a clay, a cement and a sulfite salt solidification agent to form a solidified waste matrix, wherein the solidification agent undergoes hydration and cementation reactions in the waste matrix in the presence of water. Optionally, heavy metal stabilizing agents can also be combined with the waste.

28 Claims, 4 Drawing Sheets

METHOD FOR STABILIZING CONTAMINATED WASTE

CROSS-REFERENCE TO RELATED APPLICATIONS

This application claims the benefit of U.S. Provisional Application No. 60/606,754 filed Sep. 2, 2004. That application is incorporated herein by reference in its entirety.

STATEMENT REGARDING FEDERALLY SPONSORED RESEARCH OR DEVELOPMENT

Not applicable.

BACKGROUND OF THE INVENTION

Significant challenges, notably material handling issues, are encountered when solidifying ex situ or in situ deposits, especially but not necessarily subterranean deposits, of wet oily organic waste that contains compounds that can interfere with solidification, such as vegetable and mineral oils, various oily hydrocarbons and oily derivatives thereof when present at concentrations above about 100 ppm. For example, after excavating oil-contaminated solids from an waste source (or 'hot spot'), an aqueous oily slop that remains is solidified to minimize contaminant mobility, as a requirement for site closure, and to shore up the ground above the excavation.

U.S. Pat. No. 4,726,713, incorporated herein by reference in its entirety as if set forth herein, discloses methods for solidifying waste to produce a low permeability solid mass with high load-bearing unconfined compressive strength (UCS) using a self-hardening slurry formed from a dry mix that contains, for example, attapulgite clay and ground blast furnace slag cement. A dry mix containing attapulgite and blast furnace slag cement for, inter alia, stabilizing or solidifying wet soil, solid wastes, and sediment is marketed commercially by Liquid Earth Support, Inc. under the brand name Impermix®.

The methods of the '713 patent for solidifying ordinary wet solid wastes are most effective at approximately 95-100° F. (ambient temperature in the summer months at some latitudes), but are less effective at ambient temperatures at or below about 65° F., and are still less effective at temperatures approaching freezing when the wet waste is contaminated with oily materials. For treating oil-contaminated waste, the '713 solidification process is only effective with curing at approximately 100° F.

The vendor of Impermix® recommends heating the waste matrix by adding hot water or steam, but this is operationally ineffective and cost prohibitive for large treatment areas, particularly for in situ subsurface treatment areas, and even more particularly in low temperature environments. Further, treatment at such high temperatures can cause toxic organic compounds in oily waste to become volatile and to be released from the waste.

It has also been suggested to solidify wastes that contain oily organic matter by adsorbing the organic matter to powdered activated carbon (PAC) in the '713 process, so that it takes on the solid properties of the carbon. Such treatment requires high PAC dosages and, again, is cost prohibitive for in large, in situ subsurface treatments.

Still further, highly alkaline materials such as caustic soda (NaOH) or lime (CaO) can be added to oil-contaminated waste to increase pH and accelerate solidification, but such materials cannot be added when the waste contains amphoteric heavy metals, such as lead, which are more mobile under alkaline conditions.

Methods are also known for using Portland cement (PC) to solidify an oily waste (for example, see U.S. Pat. Nos. 3,947,284; 3,980,558 and 4,209,335, each incorporated by reference herein as if set forth in its entirety). U.S. Pat. No. 5,584,792, also incorporated herein by reference as if set forth in its entirety, discloses using a combination of fly ash and circulating fluid bed combustion ash in a process for stabilizing oily petroleum refining wastes. U.S. Pat. No. 4,514,307 discloses using lime and fly ash in a process for solidifying and stabilizing waste that comprises non-biological organic compounds.

Still needed in the art are processes for solidifying wet oil-contaminated wastes in situ and ex situ, especially processes for solidifying waste that contains one or more amphoteric heavy metal, without promoting contaminant mobility or release of volatile organic compounds.

BRIEF SUMMARY OF THE INVENTION

The present invention is summarized in that a method for solidifying an oil-contaminated aqueous waste in situ or ex situ includes the step of combining the oil-contaminated waste with a clay, a cement and a sulfite salt solidification agent to form a solidified waste matrix, wherein the solidification agent undergoes hydration and cementation reactions in the waste matrix in the presence of water.

In one aspect, the invention relates to methods that permit such wastes to solidify despite the presence of oily contaminants.

In another aspect, the invention relates to methods that permit such wastes to solidify at temperatures at which existing methods cannot achieve solidification.

In yet another aspect, the invention relates to methods that permit solidification of oil-contaminated wastes that further contains at least one amorphous heavy metal.

In still another aspect, the invention relates to a solidified matrix produced in a method of the invention from an oil-contaminated aqueous waste.

In still another aspect, the invention relates to a solidified matrix produced in a method of the invention from an oil-contaminated aqueous waste that contains at least one amorphous heavy metal.

DETAILED DESCRIPTION OF THE INVENTION

Figure 1:
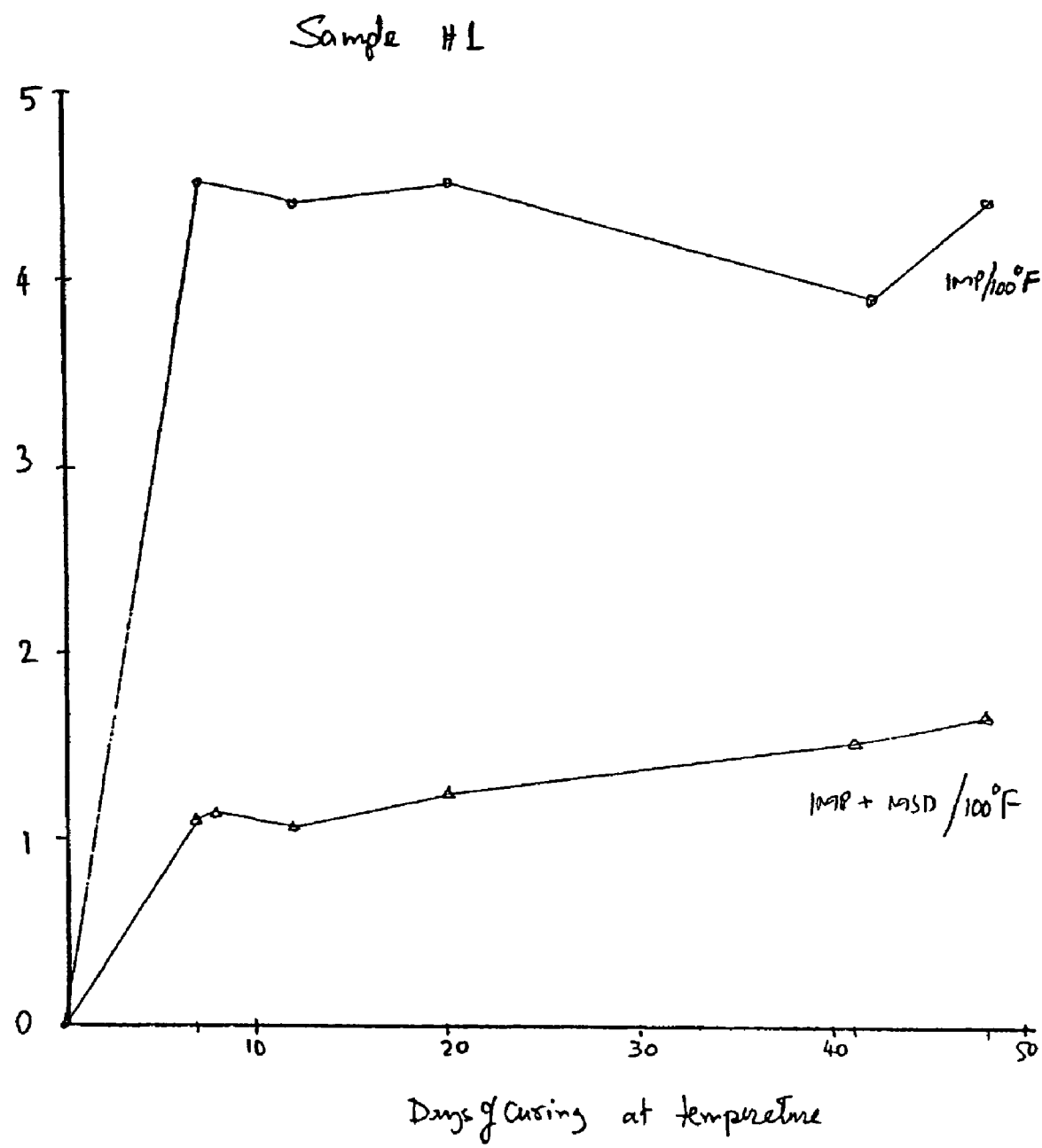
FIG. 1 depicts comparative strength gains over time of oil-contaminated waste Sample 1 treated and cured at 100° F. with Impermix® in the absence and presence of magnesium scrubber dust.

A process for solidifying an oil-contaminated aqueous waste in situ or ex situ includes the step of combining the oil-contaminated waste with a clay, a cement and a sulfite salt solidification agent to form a solidified waste matrix, wherein the salt undergoes hydration and cementation reactions in the waste matrix in the presence of water to form a hydrated sulfite salt. In the application, references to "oil" or "oily" is intended to include oils per se, as well as oily hydrocarbons, oily derivatives thereof and the like.

The skilled artisan will appreciate that the mixing step of the method can be accomplished in various ways, but that the sulfite salt and the water should not be brought into contact with one another until solidification is desired, as the water initiates the complex hydration and cementation reactions. For example, the salt can be provided as a solid powder after the contaminated waste is combined with an aqueous slurry that comprises at least one of the clay and the cement. Alternatively, the salt can be combined with the clay, the cement, or both to form a dry mixture which can then be added to the aqueous contaminated waste.

The solidified waste matrix formed in the method has an unconfined compressive strength (UCS) sufficiently high to permit construction equipment to drive on the solidified matrix (or on surface soil stabilized by a subsurface matrix provided in the method), at least about 0.5 tons/ft$^2$. The UCS is also preferably sufficiently low enough to be workable if there exists a need to move or remove the matrix, as in the non-limiting case of a building foundation or retaining wall. A solidified waste matrix having these properties can be advantageously reused by removing and sizing the material, e.g., by crushing or grinding, for landfill, backfill, utility trenches, and the like. The matrix is also characterized by contaminant mobility sufficiently low to retain the contaminants in the solidified matrix with a permeability coefficient preferably no higher than about $1 \times 10^{-5}$ cm/sec.

In addition to the clay and cement present in Impermix® or mentioned in the '713 patent, other clays and cements can be used. Other clay varieties can include sodium montmorillonite (such as Bentonite), calcium montmorillonite, and clay materials having a water absorption capability sufficiently high to form a solidified matrix having the indicated properties. The skilled person is very familiar with the attributes of both natural and synthetic clays and can readily select a clay material suited for use in the method. Suitable cement varieties can include Portland Cement, ground slag/bottom ash from high temperature melting and/or combustion operations including blast furnace slag, cupola slag, fluidized bed combustion bottom ash and the like, or combination thereof. Similarly, the skilled person can select a suitable cement.

A suitable solidification agent is a sulfite salt, especially magnesium sulfite, which can be obtained from any source. A preferred source for magnesium sulfite is magnesium scrubber dust (MSD), a/k/a "scrubber magnesium product" also known as "scrubber plant magnesium sulfite product", an industrial by-product from flue/stack gas desulfurization operations using dry magnesium oxide (MgO). During curing, the magnesium sulfite is converted in the presence of water to hydrated magnesium sulfite as well as to magnesium sulfate. Another sulfite salt source is solid calcium sulfite which can be obtained commercially or derived as a by-product from dry flue/stack gas desulfurization operations using lime or limestone. Calcium sulfite is, likewise, converted in the presence of water to comparable compounds.

The skilled artisan can determine a suitable amount of the sulfite salt to be added. The amount can vary with the composition of the waste, the desired solidification rate, and the properties desired in the solidified waste matrix, and can exceed 100% of the weight of the waste to be treated. In a typical process, the amount of the salt can range between about 5% and about 35% of the waste weight.

The method of the invention can advantageously, but not essentially, increase the rate at which the solidification process occurs. The method is operative at temperatures ranging from about 32° F. to about 110° F. The hydration and cementation reactions are exothermic and can raise the temperature of the matrix, thereby increasing the rate of solidification. However, practice of the method at high temperatures (say about 85° F. or higher) can induce release of volatile organic compounds from the waste, and should be avoided when the waste contains such compounds. Accordingly, the skilled artisan can determine and employ a dosage rate to control the temperature rise. The skilled artisan will also appreciate that the dosage of the solidification agent affects the reaction equilibrium, and hence the strength of the matrix formed. Accordingly, where a matrix having at least a minimum UCS value is desired, the skilled artisan will consider the amount of agent, and the rate at which the agent should be added to form the solidified matrix having an acceptably high UCS in an acceptably short time frame and at a temperature that does not release an unacceptably high amount of volatile organic compounds. The skilled person will also appreciate that the invention finds particular utility at temperatures lower than those at which prior solidification agents (such as Impermix®) can solidify oil-contaminated waste and at temperatures that do not release volatile organics from the wastes (e.g., between about 32° F. and about 85° F.).

In accord with the method, the oil-contaminated waste that contains amorphous heavy metals can optionally be treated in a solidification method with additional treatment agents, such as, phosphates, iron compounds, magnesium oxide, limestone, and the like in conventional treatment amounts for simultaneous heavy metal stabilization, without adverse impact on mobility of the metal or metals. Suitable metal-stabilizing additives are disclosed in U.S. Pat. Nos. 4,950,409; 5,037,479 and 5,202,033, each of which is incorporated herein by reference as if set forth in its entirety, but other stabilizing additives known to the skilled person can also be used.

The invention will be more fully understood upon consideration of the following Examples which are not intended to limit the scope of the invention.

EXAMPLE

Samples having the following characteristics were obtained from an oil-contaminated waste site:

|  | Moisture wt % | Oil & Grease (mg/kg) |
| --- | --- | --- |
| Sample 1 | 16 | 4,900 |
| Sample 2 | 21 | 1,440 |

Each sample was mixed with tap water at a ratio of 69 g waste to 150 mL water to simulate excavation seepage/slop slurry conditions. Each slurry was mixed with 30 g of Impermix® (Liquid Earth Support, Inc). Parallel tests were conducted with and without the addition of MSD followed by the optional addition of Portland Cement, as shown in the attached table. Samples treated with MSD showed a temperature rise to 91° F. from an ambient temperature of 68° F. The treated samples were then placed in thermostat-controlled chambers maintained at 100° F. and 43° F. The strength results measured by a pocket penetrometer after 8 days of curing are included in the table.

At 100° F. Impermix® alone solidified both samples to produce high strength solid mass with UCS values >4.5 tons/ft². However, no solidification occurred at 43° F. The addition of MSD along with Impermix® facilitated solidification at both 43° F. and 100° F., yielding solids with relatively low UCS values (0.7-1.3 tons/ft²). Supplemental addition of Portland Cement (PC) to the mix slightly increased the UCS values in comparison to the results with no PC addition.

Figure 2:
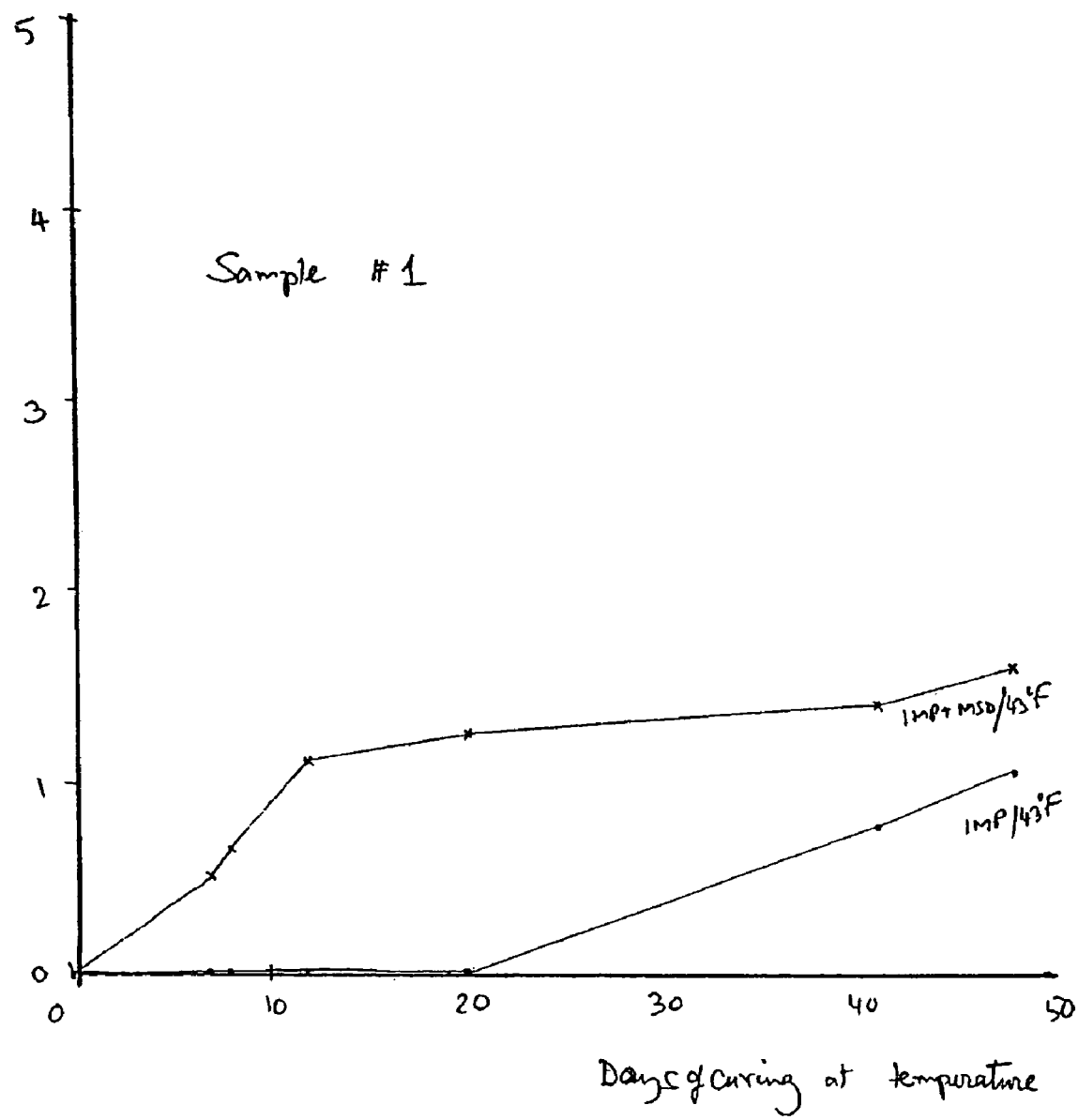
FIG. 2 depicts comparative strength gains over time of oil-contaminated waste Sample 1 treated and cured at 43° F. with Impermix® in the absence and presence of magnesium scrubber dust.
Figure 3:
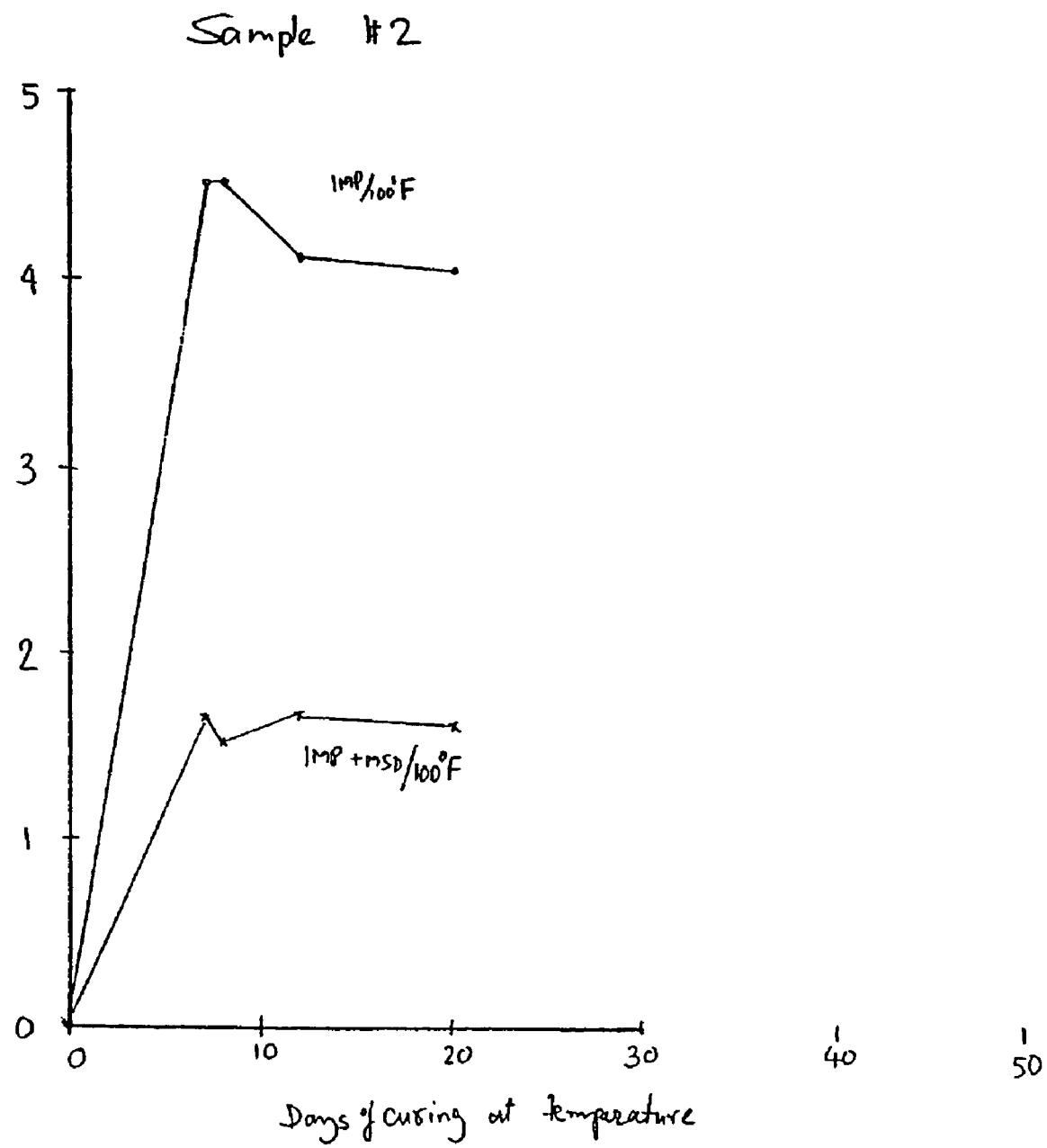
FIG. 3 depicts comparative strength gains over time of oil-contaminated waste Sample 2 treated and cured at 100° F. with Impermix® in the absence and presence of magnesium scrubber dust.
Figure 4:
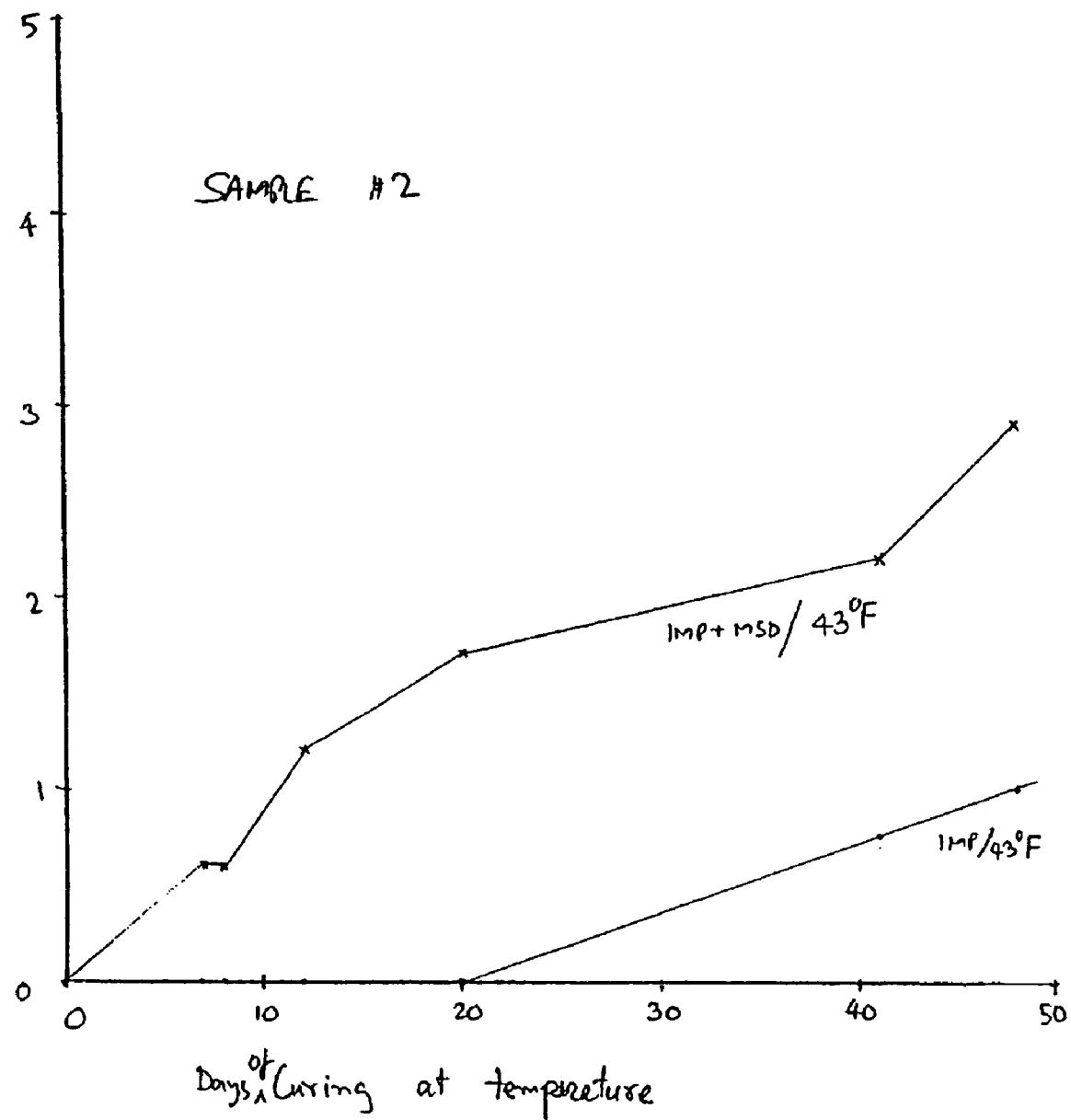
FIG. 4 depicts comparative strength gains over time of oil-contaminated waste Sample 2 treated and cured at 43° F. with Impermix® in the absence and presence of magnesium scrubber dust.

FIGS. 1 through 4 show comparative strength gains of the treated oil-contaminated waste samples over time. At 100° F., both samples, treated with Impermix® alone and Impermix® plus MSD, showed rapid strength gain during the first 8 days, peaking at different final UCS values (FIGS. 1 and 3). However, at 43° F., as shown in FIGS. 2 and 4, the Impermix® treated samples showed no strength gain during the first 20 days of curing. During this same period, treatment with Impermix® plus MSD showed many fold higher strength gain of the treated mix. The MSD added mixes showed UCS values exceeding 0.5 tons/ft² within 7 to 8 days of curing. This is of enormous significance with respect to field remediation activities in oil-contaminated sites in colder ambient conditions. Without the MSD addition the treated waste at the site cannot be worked on (i.e. being ready for the movement of earth moving equipment on top of the treated waste) for nearly 40 days, whereas, with MSD addition the treated waste is adequately solidified to be worked on within a week. This enhanced initial solidification would reduce field implementation costs substantially.

2. A method as claimed in claim 1 wherein the sulfite salt is selected from the group consisting of magnesium sulfite and calcium sulfite.

3. A method as claimed in claim 1 wherein the sulfite salt is selected from the group consisting of magnesium sulfite and calcium sulfite.

4. A method as claimed in claim 1 wherein the sulfite salt is provided in an amount between about 5% and about 35% of the waste by weight.

5. A method as claimed in claim 1 wherein the unconfined compressive strength of the matrix is sufficiently low that the matrix is movable.

6. A method as claimed in claim 1 wherein the waste further contains an amphoteric heavy metal, wherein in the mixing step the waste is also mixed with an agent for stabilizing the heavy metal in the matrix.

7. A method as claimed in claim 6 wherein the matrix has a contaminant mobility sufficiently low to retain the heavy metal in the matrix.

8. A method as claimed in claim 7 wherein the matrix has a permeability coefficient no higher than about $1 \times 10^{-5}$ cm/sec.

9. A method as claimed in claim 1 wherein the clay is selected from the group consisting of natural clay and synthetic clay.

10. A method as claimed in claim 1 wherein the clay is selected from the group consisting of attapulgite clay, calcium montmorillonite, and sodium montmorillonite.

TABLE 1

Saturated Oil-contaminated Waste Bench-scale Solidification Test Results

| | | Waste Matrix Components | | | | | |
|---|---|---|---|---|---|---|---|
| Sample No. | Test No. | Saturated Oil-contaminated Waste (g) | Tap Water (mL) | Impermix ® (g) | Other Additives Type, Weight (g) | Curing Temp (° F.) | UCS tons/ft² |
| 1 | a | 69 | 150 | 30 | — | 100 | >4.5 |
|   | b | 69 | 150 | 30 | 15 g MSD | 100 | 1.3 |
|   | c | 69 | 150 | 30 | 15 g MSD + 3 g PC | 100 | 1.8 |
|   | d | 69 | 150 | 30 | — | 43 | None |
|   | e | 69 | 150 | 30 | 15 g MSD | 43 | 0.7 |
|   | f | 69 | 150 | 30 | 15 g MSD + 3 g PC | 43 | 0.9 |
| 2 | a | 69 | 150 | 30 | — | 100 | >4.5 |
|   | b | 69 | 150 | 30 | 15 g MSD | 100 | 1.3 |
|   | c | 69 | 150 | 30 | 15 g MSD + 3 g PC | 100 | 1.6 |
|   | d | 69 | 150 | 30 | — | 43 | None |
|   | e | 69 | 150 | 30 | 15 g MSD | 43 | 0.7 |
|   | f | 69 | 150 | 30 | 15 g MSD + 3 g PC | 43 | 1.2 |

MSD—magnesium scrubber dust;
PC—Portland cement
UCS—Unconfined Compressive Strength measured on day 8 using a pocket penetrometer

We claim:

1. A method for solidifying an oil-containing waste, the method comprising the steps of:
providing the waste at a temperature above about 32° F.;
mixing a clay, a cement, a sulfite salt and water with the waste to form a solid waste matrix having an unconfined compressive strength of at least about 0.5 tons/ft², wherein the waste contains water and wherein at least one of the clay and the cement are mixed with the waste before the sulfite salt is mixed with the waste.

11. A method as claimed in claim 1 wherein the cement is selected from the group consisting of blast furnace slag cement, Portland Cement, and ground slag/bottom ash.

12. A solidified waste matrix comprising an oil-contaminated waste, a clay, a cement, and a salt selected from the group consisting of a sulfite salt, a hydrated sulfite salt and a sulfate salt, the matrix having an unconfined compressive strength of at least about 0.5 tons/ft² and a permeability coefficient no higher than about $1 \times 10^{31\ 5}$ cm/sec.

13. A matrix as claimed in claim 12, the salt being selected from the group consisting of magnesium sulfite, calcium sulfite, magnesium sulfate, calcium sulfate, hydrated magnesium sulfite and hydrated calcium sulfite.

14. A matrix as claimed in claim 12, the unconfined compressive strength of the matrix being sufficiently low that the matrix is movable.

15. A matrix as claimed in claim 12 wherein the matrix further contains an amphoteric heavy metal.

16. A matrix as claimed in claim 15 wherein the matrix has a contaminant mobility sufficiently low to retain the heavy metal in the matrix.

17. A method for solidifying an oil-containing waste, the method comprising the steps of:
providing the waste at a temperature above about 32° F.;
mixing a clay, a cement, a sulfite salt and water with the waste to form a solid waste matrix having an unconfined compressive strength of at least about 0.5 tons/ft$^2$, wherein the waste is dry and wherein the waste is combined with the water to form a slurry that is then mixed with sulfite salt.

18. A method as claimed in claim 17 wherein the sulfite salt and at least one of the clay and the cement are combined with the waste to form a dry mixture that is then combined with the water.

19. A method as claimed in claim 17 wherein the sulfite salt is selected from the group consisting of magnesium sulfite and calcium sulfite.

20. A method as claimed in claim 17 wherein the sulfite salt is provided in an amount that exceeds that of the waste by weight.

21. A method as claimed in claim 17 wherein the sulfite salt is provided in an amount between about 5% and about 35% of the waste by weight.

22. A method as claimed in claim 17 wherein the matrix is workable.

23. A method as claimed in claim 17 wherein the waste further contains an amphoteric heavy metal, wherein in the mixing step the waste is also mixed with an agent for stabilizing the heavy metal in the matrix.

24. A method as claimed in claim 23 wherein the matrix has a contaminant mobility sufficiently low to retain the heavy metal in the matrix.

25. A method as claimed in claim 24 wherein the matrix has a permeability coefficient no higher than about $1 \times 10^{-5}$ cm/sec.

26. A method as claimed in claim 17 wherein the clay is selected from the group consisting of natural clay and synthetic clay.

27. A method as claimed in claim 17 wherein the clay is selected from the group consisting of attapulgite clay, calcium montmorillonite, and sodium montmorillonite.

28. A method as claimed in claim 17 wherein the cement is selected from the group consisting of blast furnace slag cement Portland Cement, and ground slag/bottom ash.

* * * * *